United States Patent [19]
Glatter

[11] Patent Number: 6,036,250
[45] Date of Patent: Mar. 14, 2000

[54] TRAILER FOR REDUCING BOUNDRY LAYER NORMAL-PRESSURE DRAG THEREON

[76] Inventor: Charles Glatter, 403 E. 62nd St., Apt. 6B, New York, N.Y. 10021

[21] Appl. No.: 09/225,717

[22] Filed: Jan. 6, 1999

[51] Int. Cl.⁷ .................................................. B60P 3/18
[52] U.S. Cl. .............................. 296/21; 296/181; 40/541; 40/590
[58] Field of Search ................................. 296/21, 180.1, 296/180.4, 181; 40/541, 564, 590

[56] References Cited

U.S. PATENT DOCUMENTS

| | | |
|---|---|---|
| 676,822 | 6/1901 | Neumayer . |
| 1,230,369 | 6/1917 | Bayers . |
| 1,633,635 | 6/1927 | Harmon et al. . |
| 2,879,072 | 3/1959 | Rear et al. ........................... 296/181 X |
| 3,025,985 | 3/1962 | Crawford ............................. 296/181 X |
| 3,702,033 | 11/1972 | Coleman . |
| 3,852,902 | 12/1974 | Wheeler . |
| 3,935,654 | 2/1976 | Rubin . |
| 4,087,785 | 5/1978 | Dodich . |
| 5,083,826 | 1/1992 | McCrary ............................. 296/24.1 X |
| 5,181,760 | 1/1993 | Muno ....................................... 296/181 |
| 5,238,281 | 8/1993 | Chen ......................................... 296/21 |
| 5,263,756 | 11/1993 | Gaspar ..................................... 296/21 |
| 5,685,099 | 11/1997 | Favata . |
| 5,769,478 | 6/1998 | Varnese ............................... 296/181 X |

*Primary Examiner*—Joseph D. Pape
*Attorney, Agent, or Firm*—Richard L. Miller

[57] ABSTRACT

A trailer for reducing boundary layer normal-pressure drag thereon. The trailer includes a chassis, wheel assemblies, a body, a plurality of lights, and a power source. The chassis releasably attaches to a vehicle towing the trailer. The wheel assemblies are rotatably mounted to the chassis. The body is disposed on the chassis and displays advertisements. The plurality of lights are disposed in the body and selectively illuminate the advertisements on the body. The power source is disposed in the body and powers the plurality of lights. The body is symmetrically-wedge-shaped for reducing the boundary layer normal-pressure drag thereon.

23 Claims, 1 Drawing Sheet

TRAILER FOR REDUCING BOUNDRY LAYER NORMAL-PRESSURE DRAG THEREON

BACKGROUND OF THE INVENTION

1. Field of the Invention

The present invention relates to a trailer. More particularly, the present invention relates to a trailer for reducing boundary layer normal-pressure drag thereon.

2. Description of the Prior Art

Numerous innovations for trailers have been provided in the prior art that will be described. Even though these innovations may be suitable for the specific individual purposes to which they address, however, they differ from the present invention.

A FIRST EXAMPLE, U.S. Pat. No. 3,702,033 to Coleman teaches a portable display device having a base comprising running gear which includes a plurality of wheels and a pulling tongue wherein the wheels may be detachably secured to the base such that the base may be permanently affixed to a given location. A sign is reciprocally mounted on the base by means of a supporting frame such that the sign may be raised or lowered to any desired position through the operation of a lifting mechanism in the form of a power or manually operated winch connected to the sign by a pulley and cable arrangement. Lights may be arranged on both the interior and exterior of the sign and operated by a power supply, in the form of a battery or generator which also may be carried on the base of the sign.

A SECOND EXAMPLE, U.S. Pat. No. 3,852,902 to Wheeler teaches a trailer mounted billboard or display sign mounted on an axle with the sign disposed transverse to the axle during transportation of the sign from place to place and disposed parallel to the axle when positioned for display and further including ballast means carried by the axle to resist tipping of the sing from wind or other forces.

A THIRD EXAMPLE, U.S. Pat. No. 3,935,654 to Rubin teaches an illuminated sign panel adapted for mounting on the side of vehicles such as trucks and having removable and replaceable sign display areas in the form of sheets of transparent or translucent materials. A sign display area may be composed of one sheet or several. The illumination is indirect and is designed to be supplied from behind the sign display area. The display panel is rigidly and fixedly mounted on the vehicle which can be an automobile, panel truck or truck trailer, for example.

A FIFTH EXAMPLE, U.S. Pat. No. 4,087,785 to Dodich teaches a portable electric sign display unit that comprises a wheeled trailer having a main frame on which is mounted a motor-generator unit and a structure for holding a warning sign or the like in an elevated position. The sign carrying structure is collapsible into a position in which a central portion of the sign panel forms a roof over the motor-generator unit and two hinged side panels form the sides of the cover for the unit. The sign is erected by operation of a winch which first rotates the sign panel toward its vertical position and then raises the structure a further distance to the fully elevated position. The side panels are locked into position in the same plane as the central portion and electric lights forming the display are mounted on all three portions.

It is apparent that numerous innovations for trailers have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a trailer for reducing boundary layer normal-pressure drag thereon that avoids the disadvantages of the prior art.

ANOTHER OBJECT of the present invention is to provide a trailer for reducing boundary layer normal-pressure drag thereon that is simple and inexpensive to manufacture.

STILL ANOTHER OBJECT of the present invention is to provide a trailer for reducing boundary layer normal-pressure drag thereon that is simple to use.

BRIEFLY STATED, YET ANOTHER OBJECT of the present invention is to provide a trailer for reducing boundary layer normal-pressure drag thereon. The trailer includes a chassis, wheel assemblies, a body, a plurality of lights, and a power source. The chassis releasably attaches to a vehicle towing the trailer. The wheel assemblies are rotatably mounted to the chassis. The body is disposed on the chassis and displays advertisements. The plurality of lights are disposed in the body and selectively illuminate the advertisements on the body. The power source is disposed in the body and powers the plurality of lights. The body is symmetrically-wedge-shaped for reducing the boundary layer normal-pressure drag thereon.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows.

Figure 1:
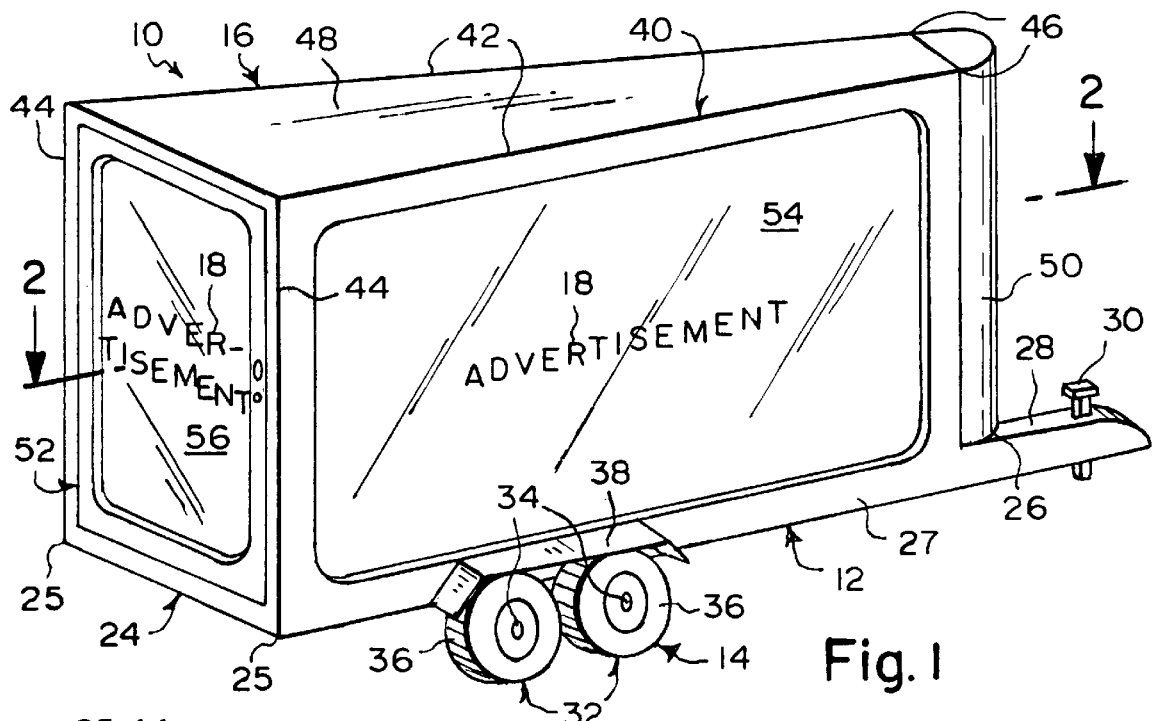
FIG. 1 is a diagrammatic perspective view of the present invention.

LIST OF REFERENCE NUMERALS UTILIZED IN THE DRAWING 10 trailer for reducing boundary layer normal-pressure drag thereon of the present invention 12 chassis for releasably attaching to vehicle for towing trailer 10

14 wheel assemblies 16 body 18 advertisements 20 plurality of lights 22 power source 24 base of chassis 12

25 ends of base 24 of chassis 12

26 vortex of chassis 12

27 pair of sides of chassis 12

28 beam of chassis 12

30 hitch of chassis 12 for engaging with vehicle for towing trailer 10

32 pair of tandem wheel assemblies of wheel assemblies 14

34 axles of pair of tandem wheel assemblies 32 of wheel assemblies 14

36 wheels of pair of tandem wheel assemblies 32 of wheel assemblies 14

38 fenders of wheel assemblies 14 for preventing dirt on wheels 36 of pair of tandem wheel assemblies 32 of wheel assemblies 14 from coming into contact with body 16

40 pair of side walls of body 16
42 uppermost edges of pair of side walls 40 of body 16
44 rearmost edges of pair of side walls 40 of body 16
46 forwardmost edges of pair of side walls 40 of body 16
48 top wall of body 16
50 nose of body 16
52 rear door of body 16
54 at least a portion of each side wall of pair of side walls 40 of body 16
56 at least a portion of rear door 52 of body 16

DETAILED DESCRIPTION OF THE PREFERRED EMBODIMENT

Referring now to the figures, in which like numerals indicate like parts, and particularly to FIG. 1, the trailer for reducing boundary layer normal-pressure drag thereon of the present invention is shown generally at 10.

Figure 2:
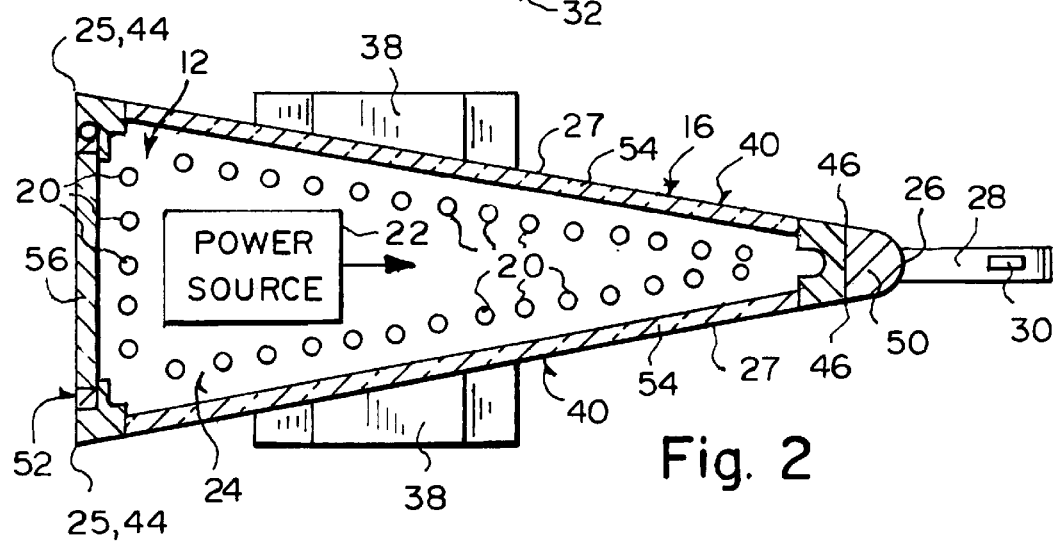
FIG. 2 is a diagrammatic cross sectional view taken on line 2—2 in FIG. 1.

The configuration of the trailer for reducing boundary layer normal-pressure drag thereon 10 can best be seen in FIGS. 1 and 2, and as such, will be discussed with reference thereto.

The trailer for reducing boundary layer normal-pressure drag thereon 10 comprises a chassis 12 for releasably attaching to a vehicle (not shown) for towing the trailer 10.

The trailer for reducing boundary layer normal-pressure drag thereon 10 further comprises wheel assemblies 14 rotatably mounted to the chassis 12.

The trailer for reducing boundary layer normal-pressure drag thereon 10 further comprises a body 16 disposed on the chassis 12 and displaying advertisements 18.

The trailer for reducing boundary layer normal-pressure drag thereon 10 further comprises a plurality of lights 20 disposed in the body 16 and selectively illuminating the advertisements 18 on the body 16.

The trailer for reducing boundary layer normal-pressure drag thereon 10 further comprises a power source 22 disposed in the body 16 and powering the plurality of lights 20.

The chassis 12 is flat, horizontally-oriented, and isosceles-triangular-shaped.

The chassis 12 has a base 24 with ends 25, a vortex 26 that extends forwardly of the base 26 of the chassis 12, towards a direction of intended travel of the trailer 10, and is semi-circular-shaped, and a pair of sides 27.

The chassis 12 further has a beam 28 that extends forwardly from the vortex 24 of the chassis 12.

The chassis 12 further has a hitch 30 that is disposed on the beam 28 of the chassis 12 for engaging with the vehicle (not shown) for towing the trailer 10.

The wheel assemblies 14 comprise a pair of tandem wheel assemblies 32 that have axles 34 that extend transversely under the chassis 12, intermediate, but closer to, the base 24 of the chassis 12 and the vortex 26 of the chassis 12, and wheels 36 that extend past the pair of sides 27 of the chassis 12.

The wheel assemblies 14 further comprise fenders 38 that extend laterally outwardly from the chassis 12 and overlie the wheels 36 of the pair of tandem wheel assemblies 32 of the wheel assemblies 14 for preventing dirt on the wheels 36 of the pair of tandem wheel assemblies 32 of the wheel assemblies 14 from coming into contact with the body 16.

The body 16 is symmetrically-wedge-shaped and has an opened interior, and comprises a pair of side walls 40 that extend vertically perpendicularly upwardly, respectively, from the pair of sides 27 of the chassis 12 to uppermost edges 42, and longitudinally from rearmost edges 44 thereof, at the ends 25 of the base 24 of the chassis 12 to forwardmost edges 46 thereof, at the vortex 26 of the chassis 12.

The body 16 further comprises a top wall 48 that is horizontally-oriented, and extends from one uppermost edge of the pair of uppermost edges 42 of the pair of side walls 40 of the body 16 to the other uppermost edge of the pair of uppermost edges 42 of the pair of side walls 40 of the body 16, and from the rearmost edges 44 of the pair of side walls 40 of the body 16 to the forwardmost edges 46 of the pair of side walls 40 of the body 16.

The body 16 further comprises a nose 50 that is semi-cylindrically-shaped, and extends vertically along the forwardmost edges 46 of the pair of side walls 40 of the body 16, perpendicularly upwardly from the vortex 26 of the chassis 12 to the top wall 48 of the body 16.

The body 16 further comprises a rear door 52 that is vertically-oriented and extends perpendicularly upwardly from the base 24 of the chassis 12 to the top wall 48 of the body 16, and hingedly from the rearmost edge of one side wall of the pair of side walls 40 of the body 16 releasably to the other rearmost edge of the other side wall of the pair of side walls 40 of the body 16, and when opened, allows access to the opened interior of the body 16.

The symmetrically-wedge-shape of the body 16 is for reducing the boundary layer normal-pressure drag. The boundary layer drag is form dependent and is defined as the difference between the boundary layer drag and the surface fiction drag. The boundary layer drag is defined as the drag associated with losses of total pressure and total temperature in the boundary layers.

The increased pressures near the nose of a body tend to push the body backwards. The decreased pressures ahead of the maximum thickness of the body tend to pull the body forward, while the pressures at the tail of the body push the body forward. *"AERODYNAMICS FOR ENGINEERING STUDENTS"* by Houghton and Brock; published by EDWARD ARNOLD LTD. 1966.

The reduced surface area of the nose 50 of the body 16 reduces the pressure acting thereon which reduces the tendency of the body 16 being pushed backwardly.

The large surface area of the rear door 52 of the body 16 reduces the pressures in front thereof which increases the tendency of the body 16 being pushed forwardly.

The large surface area of the rear door 52 of the body 16 increases the pressures acting thereon which increases the tendency of the body 16 being pushed forwardly.

At least a portion 54 of each side wall of the pair of side walls 40 of the body 16 is translucent, and is one of glass and plastic.

At least a portion 56 of the rear door 52 of the body 16 is translucent, and is one of glass and plastic.

The advertisements 18 are displayed on the at least a portion 54 of the pair of side walls 40 of the body 16 and the at least a portion 56 of the rear door 52 of the body 16.

The plurality of lights 20 extend vertically upwardly from the chassis 12 to the top wall 48 of the body 16, and along, and slightly inward of, the base 24 of the chassis 12 and the pair of sides 27 of the chassis 12, and when on, illuminate the advertisements 18 through the at least a portion 54 of the pair of side walls 40 of the body 16 and the at least a portion 56 of the rear door 52 of the body 16.

The plurality of lights 20 are one of fluorescent, incandescent, and neon.

The power source 22 is in electrical communication with, and powers the plurality of lights 20, and is one of a battery, a generator and a cable for electrically connecting to a battery (not shown) of the vehicle (not shown) towing the trailer 10.

It will be understood that each of the elements described above, or two or more together, may also find a useful application in other types of constructions differing from the types described above.

While the invention has been illustrated and described as embodied in a trailer for reducing boundary layer normal-pressure drag thereon, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A trailer for reducing boundary layer normal-pressure drag thereon, comprising:
    a) a chassis for releasably attaching to a vehicle for towing said trailer; said chassis being flat, horizontally-oriented, and isosceles-triangular-shaped; said chassis having:
        i) a base with ends;
        ii) a vortex that extends forwardly of said base of said chassis, towards a direction of intended travel of said trailer, and is semi-circular-shaped; and
        iii) a pair of sides;
    b) wheel assemblies rotatably mounted to said chassis;
    c) a body disposed on said chassis and displaying advertisements; said body being symmetrically-wedge-shaped and having an opened interior, and comprising a pair of side walls extending vertically perpendicularly upwardly, respectively, from said pair of sides of said chassis to uppermost edges, and longitudinally from rearmost edges thereof, at said ends of said base of said chassis to forwardmost edges thereof, at said vortex of chassis; said symmetrically-wedge-shape of said body being for reducing the boundary layer normal-pressure drag thereon;
    d) a plurality of lights disposed in said body and selectively illuminating said advertisements on said body; and
    e) a power source disposed in said body and powering said plurality of lights.

2. The trailer as defined in claim 1, wherein said chassis further has a beam that extends forwardly from said vortex of said chassis.

3. The trailer as defined in claim 2, wherein said chassis further has a hitch that is disposed on said beam of said chassis for engaging with the vehicle for towing said trailer.

4. The trailer as defined in claim 1, wherein said wheel assemblies comprise a pair of tandem wheel assemblies that have:
    a) axles that extend transversely under said chassis, intermediate, but closer to, said base of said chassis and said vortex of said chassis; and
    b) wheels that extend past said pair of sides of said chassis.

5. The trailer as defined in claim 4, wherein said wheel assemblies further comprise fenders that extend laterally outwardly from said chassis and overlie said wheels of said pair of tandem wheel assemblies of said wheel assemblies for preventing dirt on said wheels of said pair of tandem wheel assemblies of said wheel assemblies from coming into contact with said body.

6. The trailer as defined in claim 1, wherein said body further comprises a top wall that is horizontally-oriented, and extends from one uppermost edge of said pair of uppermost edges of said pair of side walls of said body to the other uppermost edge of said pair of uppermost edges of said pair of side walls of said body, and from said rearmost edges of said pair of side walls of said body to said forwardmost edges of said pair of side walls of said body.

7. The trailer as defined in claim 6, wherein said body further comprises a nose that is semi-cylindrically-shaped, and extends vertically along said forwardmost edges of said pair of side walls of said body, perpendicularly upwardly from said vortex of said chassis to said top wall of said body.

8. The trailer as defined in claim 6, wherein said body further comprises a rear door that is vertically-oriented and extends perpendicularly upwardly from said base of said chassis to said top wall of said body, and hingedly from said rearmost edge of one side wall of said pair of side walls of said body releasably to said other rearmost edge of said other side wall of said pair of side walls of said body, and when opened, allows access to said opened interior of said body.

9. The trailer as defined in claim 8, wherein at least a portion of each side wall of said pair of side walls of said body is translucent.

10. The trailer as defined in claim 9, wherein said at least a portion of said pair of side walls of said body is glass.

11. The trailer as defined in claim 9, wherein said at least a portion of said pair of side walls of said body is plastic.

12. The trailer as defined in claim 9, wherein at least a portion of said rear door of said body is translucent.

13. The trailer as defined in claim 12, wherein said at least a portion of said rear door of said body is glass.

14. The trailer as defined in claim 12, wherein said at least a portion of said rear door of said body is plastic.

15. The trailer as defined in claim 12, wherein said advertisements are displayed on said at least a portion of said pair of side walls of said body and said at least a portion of said rear door of said body.

16. The trailer as defined in claim 15, wherein said plurality of lights extend vertically upwardly from said chassis to said top wall of said body, and along, and slightly inward of, said base of said chassis and said pair of sides of said chassis, and when on, illuminate said advertisements through said at least a portion of said pair of side walls of said body and said at least a portion of said rear door of said body.

17. The trailer as defined in claim 1, wherein said plurality of lights are fluorescent.

18. The trailer as defined in claim 1, wherein said plurality of lights are incandescent.

19. The trailer as defined in claim 1, wherein said plurality of lights are neon.

20. The trailer as defined in claim 1, wherein said power source is in electrical communication with, and powers said plurality of lights.

21. The trailer as defined in claim 1, wherein said power source is a battery.

22. The trailer as defined in claim 1, wherein said power source is a generator.

23. The trailer as defined in claim 1, wherein said power source is a cable for electrically connecting to a battery of a vehicle towing said trailer.

* * * * *